(12) United States Patent
Kunikata

(10) Patent No.: US 8,156,258 B2
(45) Date of Patent: Apr. 10, 2012

(54) RECORDING AND REPLAYING DEVICE

(75) Inventor: Norikazu Kunikata, Hachioji (JP)

(73) Assignee: TEAC Corporation, Tama-shi, Tokyo (JP)

( * ) Notice: Subject to any disclaimer, the term of this patent is extended or adjusted under 35 U.S.C. 154(b) by 79 days.

(21) Appl. No.: 12/542,617

(22) Filed: Aug. 17, 2009

(65) Prior Publication Data

US 2010/0046342 A1    Feb. 25, 2010

(30) Foreign Application Priority Data

Aug. 25, 2008  (JP) .................................. 2008-215886

(51) Int. Cl.
*G06F 3/00* (2006.01)
*G06F 13/00* (2006.01)

(52) U.S. Cl. ..................... 710/14; 710/5; 710/8; 710/15

(58) Field of Classification Search .......................... None
See application file for complete search history.

(56) References Cited

U.S. PATENT DOCUMENTS

| | | | |
|---|---|---|---|
| 6,735,671 B1 | 5/2004 | Kida | |
| 2002/0093583 A1* | 7/2002 | Ito | 348/373 |
| 2002/0101515 A1* | 8/2002 | Yoshida et al. | 348/211 |

FOREIGN PATENT DOCUMENTS

| | | |
|---|---|---|
| JP | 6149718 A | 5/1994 |
| JP | 10027154 A | 1/1998 |
| JP | 2001022527 A | 1/2001 |
| JP | 2005182658 A | 7/2005 |
| JP | 2006-293812 A | 10/2006 |
| JP | 2008027240 A | 2/2008 |

OTHER PUBLICATIONS

Japanese Office Action issued in corresponding JP Application No. 2008-215886, mailed Jan. 31, 2012, 6 pages.

* cited by examiner

*Primary Examiner* — Tariq Hafiz
*Assistant Examiner* — Scott Sun
(74) *Attorney, Agent, or Firm* — Seed IP Law Group PLLC

(57) ABSTRACT

A recording and replaying device is provided in which a user can easily diagnose failure when a built-in storage device of the device fails. In a normal operation state, a microcomputer controls a signal path switching mechanism to connect a signal processing device and a hard disk drive (HDD). In an abnormal operation state, the microcomputer sets a USB interface device to effective state, and controls the signal path switching mechanism to connect the USB interface device and the hard disk drive (HDD), so that the hard disk drive is recognized by an external personal computer as a USB mass storage.

7 Claims, 3 Drawing Sheets

RECORDING AND REPLAYING DEVICE

PRIORITY INFORMATION

This application claims priority to Japanese Patent Application No. 2008-215886, filed on Aug. 25, 2008, which is incorporated herein by reference in its entirety.

BACKGROUND

1. Technical Field

The present invention relates to a recording and replaying device having a recording medium such as a hard disk drive, an optical disk, and a semiconductor memory.

2. Related Art

In the related art, when a recording and replaying device which has a built-in hard disk drive or the like fails, or when the recording and replaying device may have failed, the recording and replaying device must be disassembled, the hard disk drive or the like must be taken out and connected to a separate environment such as an inspection environment, information which leads to identification of operation status of the hard disk drive or the like or a cause of the failure must be collected, and the recorded data must be checked, or the like.

JP 2006-293812 A discloses a recording and replaying device having a built-in hard disk drive which is not detachable, wherein it is judged whether recording state information of a signal recorded on a hard disk drive is normal or abnormal, and, when the judgment result indicates abnormal, the recording state information is transmitted to a factory through a communication line so that the recording state information can be analyzed at the factory and repair information is transmitted from the factory to the recording and replaying device.

However, disassembly of a device when a precision part such as a hard disk drive is detached must be executed by a person with certain experience, and work involved with this leads to an increase in maintenance cost. In addition, the work for connecting the precision part such as the hard disk drive to the inspection environment and inspecting the precision part is also required to a certain degree regardless of the type of failure, and the cost and time period required for inspection or the like is also a significant burden. In addition, when the device is disassembled and the hard disk drive is detached, generally, the power supply of the device must be switched OFF. However, when an abnormal phenomenon occurs due to a temporary reason, if the power supply is switched OFF, the abnormal phenomenon may not be reproduced, resulting in difficulty in identification of the cause.

Moreover, in the technique of JP 2006-293812 A, when a problem occurs in the hard disk drive, error information is transmitted to a factory (or a support center of the manufacturer) through a communication line (such as the Internet), and the repairing information is obtained from the factory and the error is recovered. However, in this configuration, there is the inconvenience that the device must be constantly connected to the external communication line. In addition, in the system, the factory supplies the repair information (repair program), and the user cannot directly check the state of the hard disk drive. Therefore, there is a possibility that important data may be lost during repair.

SUMMARY

The present invention advantageously provides a device in which a user can easily execute an abnormality diagnosis when abnormality occurs in a built-in storage device of the device.

According to one aspect of the present invention, there is provided a recording and replaying device comprising a built-in storage unit, a signal processing unit which processes data, an input/output interface for connection with an external device, a switching unit which selectively connects between the signal processing unit and the storage unit or between the input/output interface and the storage unit, and a control unit which in a normal operation state controls the switching unit to connect the signal processing unit and the storage unit, and which in an abnormal operation state controls the switching unit to connect the input/output interface and the storage unit to allow the storage unit to be recognized by an external device as an external storage device.

According to another aspect of the present invention, it is preferable that, in the recording and replaying device, the control unit sets the input/output interface to an ineffective state in the normal operation state and sets the input/output interface to an effective state in the abnormal operation state.

According to another aspect of the present invention, there is provided a recording and replaying device comprising a built-in storage unit, an input/output interface for connection with an external device, and a control unit which in a normal operation state, when the device is connected to an external device controls the storage unit to function as a data storage unit using a particular protocol, and which in an abnormal operation state, when the device is connected to an external device, controls the storage unit to function as a mass storage which is connected through the input/output interface.

According to various aspects of the present invention, even when abnormality occurs in a built-in storage device of a device, the user can easily diagnose the abnormality or repair.

DETAILED DESCRIPTION

A preferred embodiment of the present invention will now be described with reference to the drawings.

Figure 1:
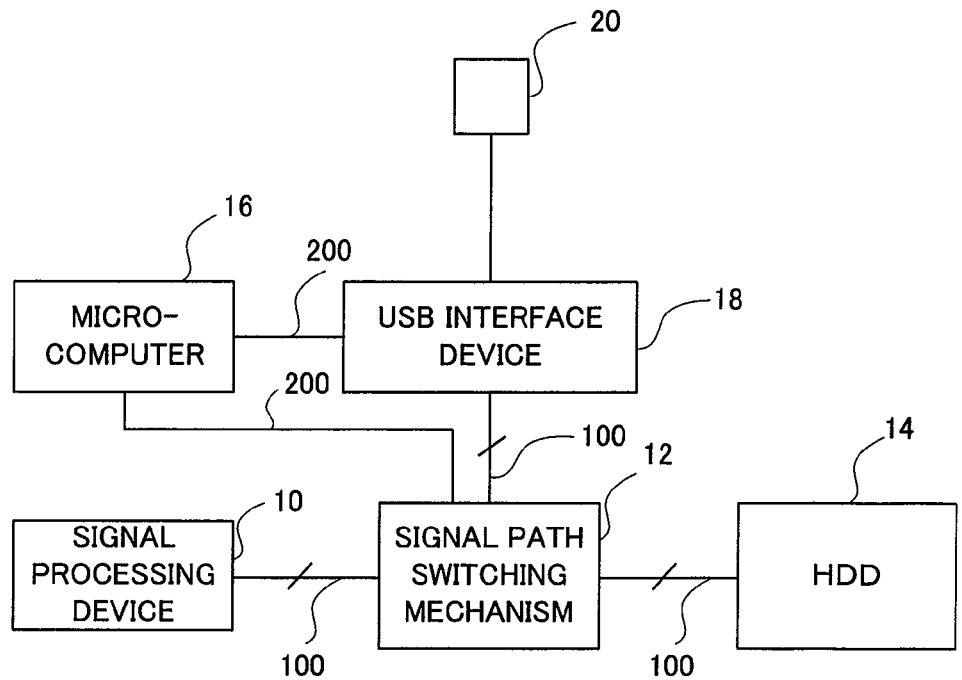
FIG. 1 is a structural block diagram of a preferred embodiment of the present invention.

FIG. 1 is a structural block diagram of a recording and replaying device according to a preferred embodiment of the present invention. The recording and replaying device is, for example, a data recorder which records music data in a predetermined format (such as the MP3 format). The recording and replaying device comprises a signal processing device 10, a signal path switching mechanism 12, a hard disk drive (HDD) 14 which is a built-in storage device, a microcomputer 16, a USB interface device 18, and a USB terminal 20.

The signal processing device 10 comprises a DSP (digital signal processor), and executes various processes on music data which is input from an external input terminal (not shown) such as encoding/decoding processing, compression/decompression processing, mixing processing, effect processing, etc.

The hard disk drive (HDD) 14 is connected to the signal processing device 10 through the signal path switching mechanism 12, and stores the music data to which signal process is applied by the signal processing device 10. During playback, the music data stored in the hard disk drive (HDD) 14 is read, and supplied to the signal processing device 10 through the signal path switching mechanism 12.

The USB interface device 18 transmits and receives data to and from an external device connected through the USB terminal 20. The USB interface 18 is connected to the hard disk drive (HDD) 14 through the signal path switching mechanism 12.

The signal path switching mechanism 12 comprises a semiconductor switch circuit such as a MOSFET, and switches a signal path according to a control signal from the microcomputer 16. The signal path switching mechanism 12 switches the signal path so that the signal processing device 10 and the hard disk drive (HDD) 14 are connected by a data line 100 during a normal operation of the device, and the USB interface device 18 and the hard disk drive (HDD) 14 are connected by the data line 100 during an abnormal operation of the device. In addition, the signal path switching mechanism 12 also switches the signal path so that even during the normal operation of the device, the USB interface device 18 and the hard disk drive (HDD) 14 are connected according to an operation from a user.

The microcomputer 16 judges whether the device is in the normal operation state or the abnormal operation state, and outputs a control signal to the signal path switching mechanism 12 through a control line 200 according to the judgment result, to control the switching operation of the signal path switching mechanism 12. The microcomputer 16 also controls the ON/OFF operation of the USB interface device 18 through the control line 200 according to the judgment result. For example, at startup or at an arbitrary timing, the microcomputer 16 transmits a command to the hard disk drive (HDD) 14 and receives a response signal from the hard disk drive (HDD) 14. The microcomputer 16 judges whether the hard disk drive (HDD) is operating normally or is in an abnormal state based on a response (including a state of no response) from the hard disk drive (HDD).

The signal processing device 10, the signal path switching mechanism 12, the microcomputer 16, and the USB interface device 18 may be integrated into an IC.

Figure 2:
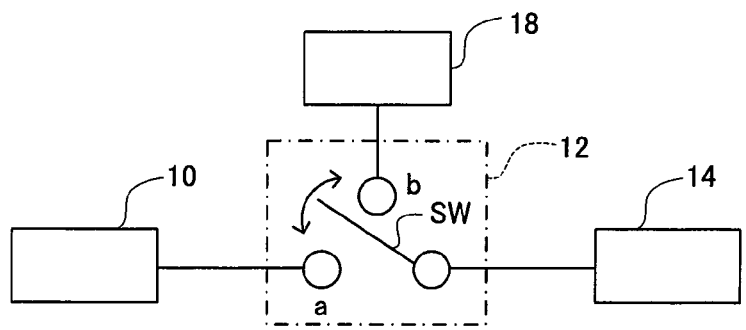
FIG. 2 is a functional block diagram of a signal path switching mechanism.
Figure 3:
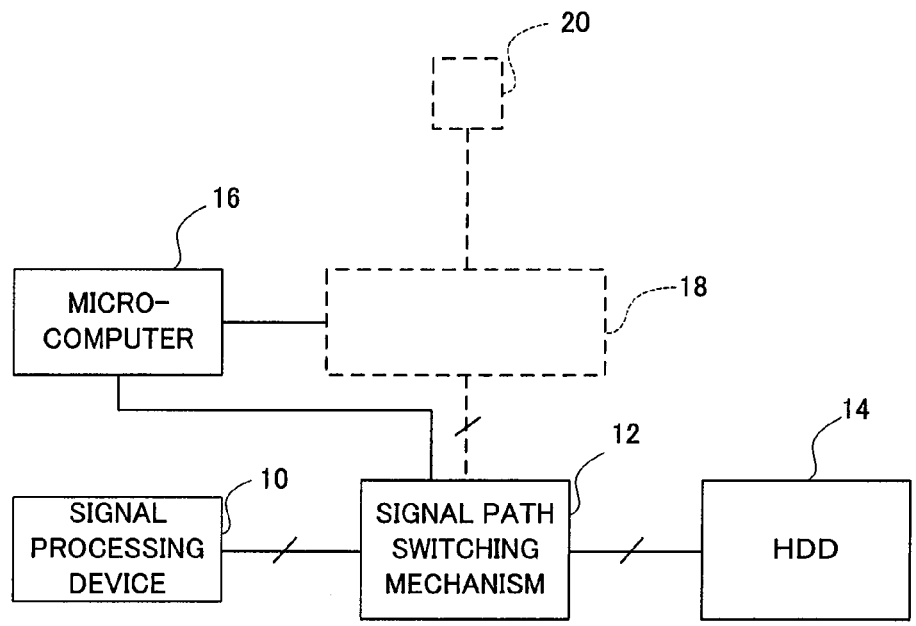
FIG. 3 is an explanatory diagram of a circuit state during normal operation.

FIG. 2 diagrammatically shows a switching operation of the signal path switching mechanism 12. When the device is in the normal operation state, the microcomputer 16 switches the switch SW of the signal path switching mechanism 12 to a side of the connection point a. With this process, the signal processing device 10 and the hard disk drive (HDD) 14 are connected. FIG. 3 shows a circuit structure in this case. The signal processing device 10 and the hard disk drive (HDD) 14 are connected, and music data which is input from an input terminal (not shown) is subjected to various processes by the signal processing device 10, and is recorded in the hard disk drive (HDD) 14. Alternatively, the music data which is recorded in the hard disk drive (HDD) is read and supplied to the signal processing device 10, subjected to various processes, and output from an output terminal (not shown). On the other hand, the USB interface device 18 and the USB terminal 20 are separated from the circuit, and are not involved in transmission and reception of music data. The microcomputer 16 switches the connection point of the switch SW to the side of a in the default state and sets the function of the USB interface device 18 to be ineffective. Therefore, in the normal operation state, even when an external device such as, for example, a personal computer is connected, the personal computer does not recognize the hard disk drive (HDD) 14. In the normal state of the device, when the user operates on the operation switch or the operation button of the device to set the USB terminal to effective state, the microcomputer 16 switches the switch SW of the signal path switching mechanism 12 to the side of the connection point b and sets the function of the USB interface device 18 to be an effective state. With this process, the external device and the hard disk drive (HDD) 14 are connected through the path of the USB interface device 18 and the USB terminal 20, and the music data can be transmitted and received.

Figure 4:
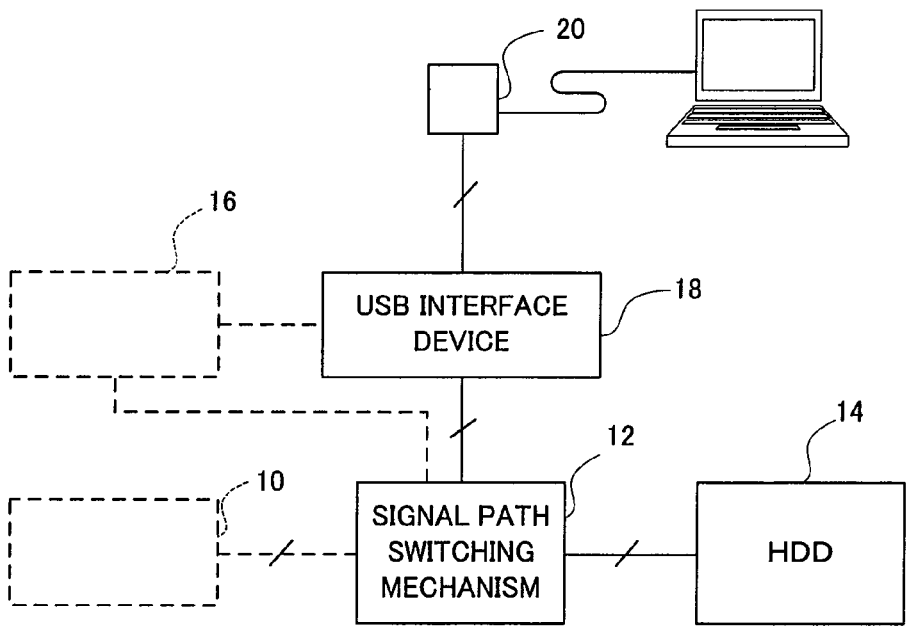
FIG. 4 is an explanatory diagram of a circuit state during abnormal operation.

When the device turns to the abnormal operation state, the microcomputer 16 activates the USB interface device 18 and sets the USB interface device 18 to an effective state and also switches the switch SW of the signal path switching mechanism 12 to the side of the connection point b. With this process, the USB terminal 20 and the USB interface device 18 are connected to the hard disk drive (HDD) 14. FIG. 4 shows a circuit structure in this case. The signal processing device 10 is separated from the circuit. Although the microcomputer 16 is connected in the circuit, the function is stopped. When the external device such as, for example, a personal computer 22 is connected to the USB terminal 20, the personal computer 22 is connected to the hard disk drive (HDD) 14 through the USB interface device 18, and the personal computer 22 can recognize the hard disk drive (HDD) 14 as a USB mass storage conforming with the USB mass storage class. The hard disk drive (HDD) 14 which is recognized as the USB mass storage can be directly accessed from the personal computer 22, and status of the hard disk drive (HDD) 14 can be managed, the data can be read, and processes such as initialization can be applied. The USB mass storage class is a standard which is defined in order to connect a large-capacity storage device (mass storage) such as a floppy disk, a hard disk drive, and a memory card to the USB port of the computer. A USB device conforming with the standard is recognized as an external storage device when the USB device is connected to the port, and the data can be exchanged using the general-purpose OS and with a normal drag-and-drop operation, in addition to the data exchange with the dedicated application attached to the device.

The state of FIG. 4 is similar to the case where the device sets the USB terminal to the effective state according to an operation of the user in the normal operation state. In other words, in the present embodiment, when the microcomputer 16 detects abnormality of the device, a mechanism for setting the USB terminal to the effective state is utilized to automatically set the USB terminal to an effective state, to enable access from the external personal computer 22 to the hard disk drive (HDD) 14.

Figure 5:
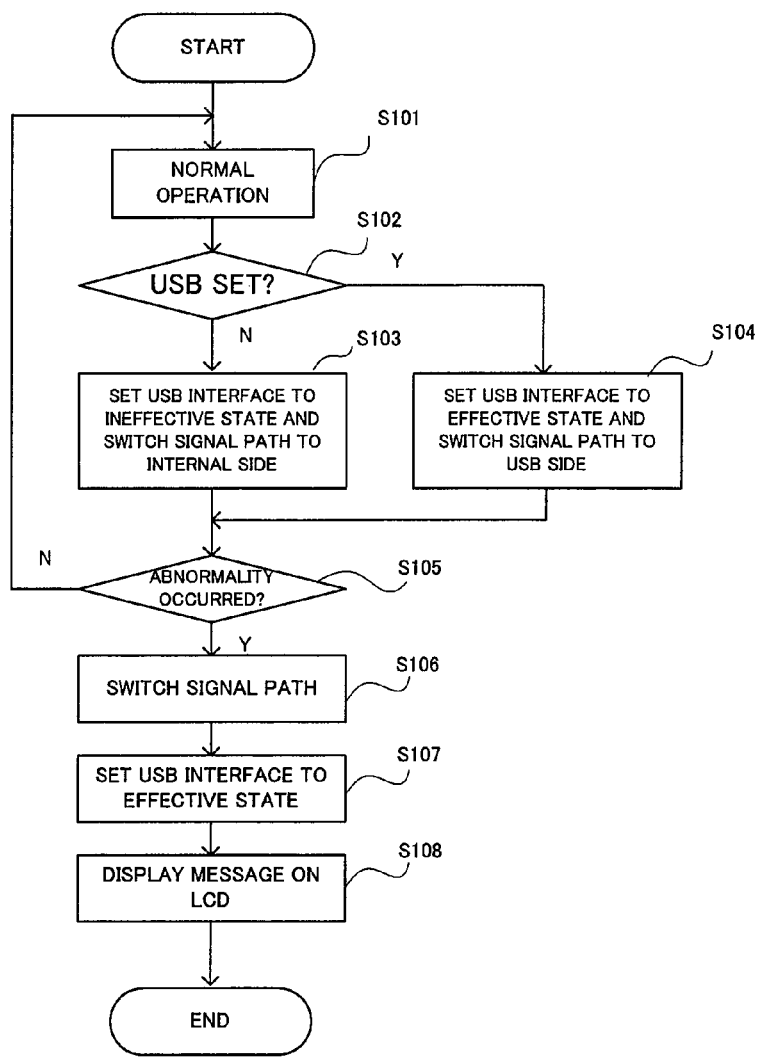
FIG. 5 is a process flowchart of a preferred embodiment of the present invention.
Figure 6:
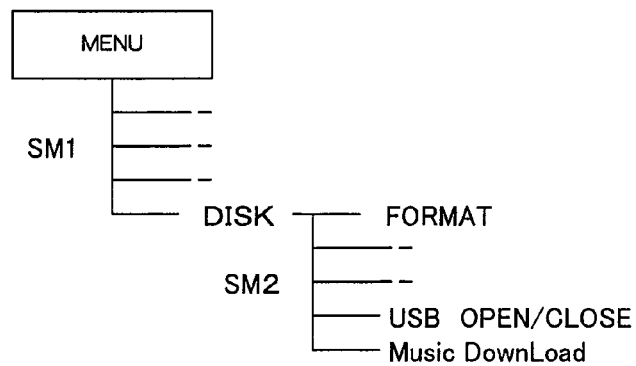
FIG. 6 is an explanatory diagram showing an example of a hierarchical menu.

FIG. 5 shows a process flowchart of the present embodiment. When the power supply of the device is switched ON, after a predetermined startup process is executed, the device transitions to a normal operation state (S101) In the normal operation state, recording and replaying of music data are executed according to operations from the user. The operations of the user include, for example, pressing of a record button, pressing of a replay button, and selection of music data. The music data is encode-processed by the signal processing device 10, converted to a format such as the MP3 format, and stored in the hard disk drive (HDD) 14. The format may be a format other than the MP3 format. During execution of the normal operation, the microcomputer 16 judges whether or not the user has executed a setting for setting the USB to an effective state (S102). The operation for setting the USB to an effective state is, for example, an operation using a hierarchical menu. FIG. 6 shows an example of the hierarchical menu. The hierarchical menu is sequentially displayed on a display device according to the operation of the user. When the user selects a menu, a submenu of a first hierarchical level is displayed. When the user selects DISK, a lower hierarchical level including a submenu of FORMAT and USB OPEN/CLOSE is displayed. When the user selects the USB OPEN/CLOSE menu, the setting for setting the USB to an effective state is started.

When the user does not set the USB to the effective state, the microcomputer 16 maintains the USB interface device 18 in the default state (with the switch SW connected to the side of the connection point a), that is, in an operation stopped state (S103). When the user has executed the setting to set the USB to the effective state using the hierarchical menu, the microcomputer 16 activates the USB interface device 18 to set the USB interface device 18 to the effective state, and controls the signal path switching mechanism 12 to switch the signal path to the side of the USB (switch the switch SW to the side of the connection point b) (S104).

The above-described processes are repeatedly executed in the normal operation state.

On the other hand, the microcomputer 16 judges, through an interruption process or the like, whether or not there is an abnormality in the device, more specifically in the built-in hard disk drive (HDD) 14, by a command response from the hard disk drive (HDD) 14 (S105). When there is no abnormality, the normal operation state is maintained. When there is no response from the hard disk drive (HDD) 14 or when an abnormality has occurred such as that data cannot be read, the microcomputer 16 automatically outputs the control signal to the signal path switching mechanism 12 without the operation of the user, and switches the switch SW to the side of the connection point b (S106) and activates the USB interface device 18 to set the USB interface device 18 to the effective state (S107). With this process, the circuit state shown in FIG. 4 is realized, and by the user connecting the personal computer 22 to the USB terminal 20 it is possible to access the hard disk drive (HDD) 14 as the USB mass storage. In addition, an error message and information indicating that the USB is in the effective state are displayed on a display device (LCD or the like) of the device (S108).

After the user executes abnormality diagnosis of the hard disk drive (HDD) 14 using the personal computer 22 or executes the repairing process, the user temporarily switches OFF the power supply of the device and again switches ON the power supply. The microcomputer 16 sets the USB interface device 18 to the default state, that is, the ineffective state, and switches the switch SW of the signal path switching mechanism 12 to the side of the connection point a (internal side), to recover the circuit state of FIG. 3.

As described, in the present embodiment, when an abnormality occurs in the device, the microcomputer 16 automatically switches the signal path, to transition to a state where the hard disk drive (HDD) 14 can be recognized as the USB mass storage. Because of this, when there is abnormality in the device, the user can simply connect the personal computer 22 to the USB terminal 20 of the device, to access the hard disk drive (HDD) 14 from the user's personal computer 22. Therefore, in the present embodiment, even when abnormality occurs in the device, it is possible to read data from or write data to the hard disk drive (HDD) 14 using a general-purpose application program which is equipped in a general-purpose personal computer, without connection to a particular inspection environment, so that the cause of the operation defect or hints for identifying the cause can be easily obtained. In addition, there is a possibility that the deficiency can be relatively easily resolved by rewriting data recorded in the hard disk drive (HDD) 14. Thus, the device is very convenient for the user. Moreover, in the present embodiment, during the normal operation, the USB is set to the ineffective state, and the USB is maintained at the ineffective state unless a predetermined operation (operation to trace the hierarchical menu and select a predetermined menu) is executed. Because of this, it is possible to prevent unguarded operation of the hard disk drive (HDD) 14 from the outside, and to maintain the confidentiality of the data.

In the present embodiment, a hard disk drive (HDD) 14 is exemplified, but the device may be a semiconductor memory such as the flash memory or an optical disk drive which uses an optical disk as a recording medium.

Similarly, in the present embodiment, USB is exemplified, but the present embodiment may be applied to other interfaces such as, for example, Bluetooth, IEEE 1394, PLC (power line communication), etc.

It is also preferable that, in a case where the USB mass storage class is not used for communication with the external device and a special protocol is used within a normal usage range by the user, for example, when the device is connected to a particular website and music data is downloaded using a particular protocol, the data transmission and reception by the special protocol is interrupted only when failure is detected and the protocol is switched to the general-purpose USB mass storage. When this configuration is applied to the present embodiment, for example, a Music Download submenu may be prepared in the hierarchical menu, and when this submenu is selected the USB interface device 18 is opened in the download mode (state of operation in the special protocol), so that the device is connected to the particular website through the USB terminal 20 and the personal computer 22.

In the present embodiment, a configuration is employed in which, when the abnormality or failure of the device is detected, the microcomputer 16 automatically sets the USB to an effective state so that the hard disk drive (HDD) 14 can be recognized as the USB mass storage. Alternatively, a configuration may be employed in which, when abnormality or failure is detected, the microcomputer 16 sets the USB to an effective state, triggered by an operation by the user. For example, when failure is detected in a configuration where the music data is downloaded by connecting to a particular website and using a particular protocol, with the user operating a particular button of the device, the microcomputer 16 may interrupt the data transmission and reception by the particular protocol and transition to a state where the built-in memory can be recognized as the USB mass storage. Although the user cannot download the music data using the special protocol, the user can still execute operations such as reading, from the personal computer, the data which is already recorded in the device.

What is claimed is:

1. A recording and replaying device, comprising:
a built-in storage unit;
a signal processing unit, which processes data;
an input/output interface for connection with an external device;
a switching unit, which selectively connects between the signal processing unit and the storage unit or between the input/output interface and the storage unit; and
a control unit, which determines whether the storage unit operates in a normal or failing operation state, which controls the switching unit to connect the signal processing unit and the storage unit when the storage unit operates in the normal operation state, and which controls the switching unit to connect the input/output interface and the storage unit to allow the storage unit to be recognized by the external device as an external storage device when the storage unit operates in the failing operation state.

2. The recording and replaying device according to claim 1, wherein
the control unit sets the input/output interface to an ineffective state in the normal operation state and sets the input/output interface to an effective state in the failing operation state.

3. The recording and replaying device according to claim 1, wherein
the storage unit is a hard disk drive, a semiconductor memory, or an optical disk.

4. The recording and replaying device according to claim 1, wherein
the input/output interface is a universal serial bus.

5. The recording and replaying device according to claim 1, wherein
the control unit controls the switching unit to automatically connect the input/output interface and the storage unit in the failing operation state.

6. A recording and replaying device, comprising:
a built-in storage unit;
an input/output interface for connection with an external device; and
a control unit that determines whether the storage unit operates in a normal or failing operation state, that controls the storage unit to function as a data storage unit for the recording and replaying device when the storage unit operates in the normal operation state, and that controls the storage unit to function as a mass storage for the external device, which is connected through the input/output interface, when the storage unit operates in the failing operation state.

7. The recording and replaying device according to claim 6, wherein
the control unit controls the storage unit to function as a USB mass storage in the failing operation state.

* * * * *